United States Patent [19]

Stefancin, Jr.

[11] Patent Number: 4,639,101

[45] Date of Patent: Jan. 27, 1987

[54] THREE DIMENSIONAL MIRRORED AQUARIUM ORNAMENT

[76] Inventor: Ronald J. Stefancin, Jr., 4120 Columbia Sq., 101, North Olmsted, Ohio 44070

[21] Appl. No.: 725,899

[22] Filed: Apr. 22, 1985

[51] Int. Cl.⁴ .......................... G02B 7/18; G02B 5/08; A01K 63/00
[52] U.S. Cl. .................................. 350/616; 350/612; 119/5; D25/73
[58] Field of Search ........................ 350/606, 616–618, 350/622, 625, 631, 641, 589, 590; D25/73, 90; D30/6, 12; 248/DIG. 10; 119/5

[56] References Cited

U.S. PATENT DOCUMENTS

| | | | |
|---|---|---|---|
| 2,402,717 | 6/1946 | Winer | 350/590 X |
| 2,808,024 | 10/1957 | Glidden | D30/6 X |
| 2,916,184 | 12/1959 | Hartley | 248/DIG. 10 X |
| 2,917,856 | 12/1959 | Soloff . | |
| 3,119,371 | 1/1964 | Zuckerman | 119/5 |
| 3,304,912 | 2/1967 | Hackman et al. | 119/5 |
| 3,648,659 | 3/1972 | Jones | 248/DIG. 10 X |
| 3,748,982 | 7/1973 | Ries . | |
| 3,867,013 | 2/1975 | Ashenfarb | 350/616 |
| 4,534,651 | 8/1985 | Minikane | 350/590 X |

*Primary Examiner*—Donald Watkins
*Attorney, Agent, or Firm*—Baldwin, Egan & Fetzer

[57] ABSTRACT

A three dimensional mirrored aquarium ornament for use in a fish aquarium. The ornament includes a plurality of side mirror segments, each of which comprises a base edge and side edges with the side edges of adjacent mirror segments being disposed in generally abutting condition to define an enclosure. In certain embodiments, completely separate side mirror segments are assembled to provide the enclosure with a sealing substance being provided, extending along the butting side edges of the separate mirror segments, for sealing the interior of the ornament from ingress of water, as well as sealing the reflective coating of the mirror segments against water deterioration. The ornament in certain embodiments, includes a bottom wall extending transversely between the side mirror segments and there is provided a sealing substance sealing the bottom wall to the side mirror segments, and sealing the bottom edges of the mirror segments, and means is disposed interiorly of the ornament enclosure for weighting the same down in the water.

In another embodiment of the mirrored ornament, the enclosure is formed as a one-piece enclosure instead of completely separate mirror segments, and without a bottom wall, and only the bottom edges of the ornament are provided with the sealing substance, to prevent water deterioration of the reflective or mirror coating on the side surfaces thereof. In this embodiment, water is permitted to enter the ornament enclosure and the weight of the latter causes it to retain its position in the aquarium.

12 Claims, 10 Drawing Figures

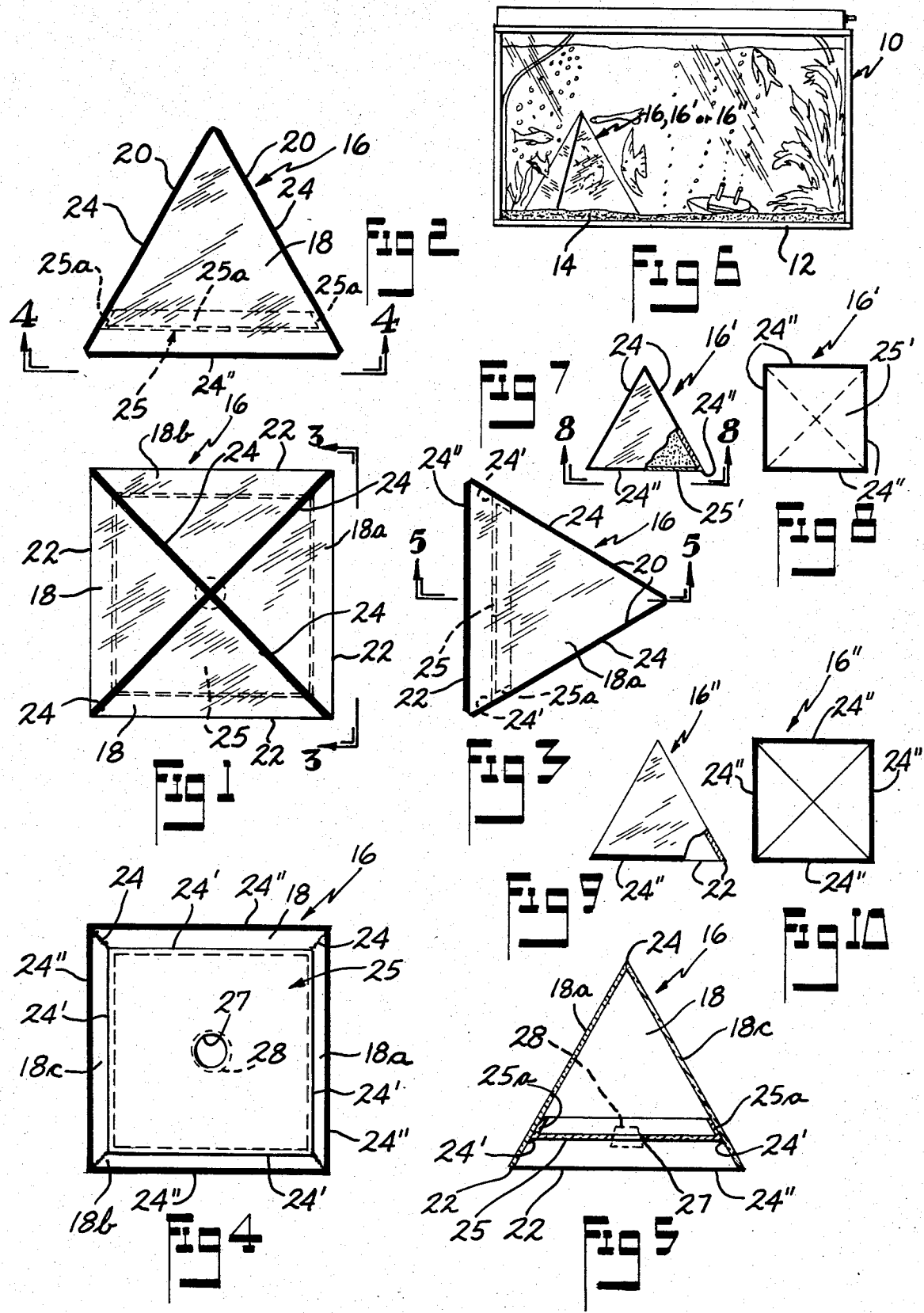

THREE DIMENSIONAL MIRRORED AQUARIUM ORNAMENT

This invention relates in general to a decorative three dimensional mirrored ornament adapted for use with a fish aquarium and more particularly relates to a decorative aquarium ornament which is of simplified construction and which expeditiously provides for the construction or manufacture of the ornament and in a manner wherein the ornament will effectively be disposeable in a water filled fish aquarium without deterioration of the reflective coating of the mirrored side surfaces.

In addition to its decorative function, the ornament is especially adapted for use with varieties of fish which establish an order of dominance in the colony in the aquarium such as, for instance, the Betta fish (Siamese fighting fish), and which is effective to cause the fish to swim actively about the ornament due to the image of the fish appearing on the side mirror segments as such fish approaches the ornament, and moves laterally with respect thereto, whereby its reflection moves from one side mirror segment to the adjacent side mirror segment, thereby causing the fish to move about the ornament, and in effect following its reflection about the ornament.

BACKGROUND OF THE INVENTION

Decorative ornaments for use with fish aquariums are known in the prior art. U.S. Pat. No. 3,304,912 dated Feb. 21, 1967 and issued to J. G. Hackman et al discloses a decorative ornament for use in a fish aquarium for isolating particular fish within the aquarium. The Hackman ornament is of an elongated tubular nature and is preferably formed of transparent material such as glass or plastic.

Three dimensional mirrored elements are also known in the prior art including mirrored pyramidal type configuration of members. U.S. Pat. No. 2,197,856 dated Dec. 22, 1959 in the name of M. Soloff, U.S. Pat. No. 3,748,982 dated July 31, 1973 in the name of Gordon E. Ries, and U.S. Pat. No. 3,867,013 dated Feb. 18, 1975 in the name of Sidney Ashenfarb disclose such pyramidal-type prior art members including mirrored members.

SUMMARY OF THE INVENTION

The present invention provides a decorative mirrored ornament adapted for use in a fish aquarium which may and preferably does contain a fish species which tends to establish an order of dominance in the colony in the aquarium, such as for instance the Betta fish (Siamese fighting fish) and wherein the ornament is comprised of a plurality of side mirror segments each of which comprises a base edge and side edges and with the side edges of adjacent mirrored segments being disposed in generally abutting condition to define an enclosure. In certain embodiments, the enclosure is formed of completely separate mirror segments with sealing means extending along the abutting side edges thereof for sealing the interior of the ornament from the ingress of water and sealing the mirror segment edges against water deterioration of the reflective mirror coating on the segments, and with the ornament including a bottom wall extending transversely between the side mirror segments and including sealing means sealing the bottom wall to the side mirror segments as well as sealing the bottom edges of the mirror segments against water deterioration of the reflective coating on the segments.

In another embodiment of the mirrored ornament, the enclosure is formed as a one-piece enclosure instead of from separate mirror segment members, and without any bottom wall. In such embodiment, only the bottom edges of the ornament are provided with sealing means to prevent water deterioration of the reflective coating on the interiors of the side mirror segments or sections, and water from the aquarium is adapted to enter the ornament enclosure and displace air therein when the ornament is disposed in a water filled fish aquarium.

Accordingly, an object of the invention is to provide a novel aquarium ornament adapted to be disposed interiorly of a fish aquarium, with the ornament comprising a decorative, three dimensional mirrored member.

Another object of the invention is to provide an ornament of the latter type formed from a plurality of individual side mirror segments disposed in generally abutting condition to define an enclosure, and which includes means sealing the abutting edges of the defining walls of the ornament, so as to prevent the ingress of water interiorly of the ornament, and including means weighting the ornament so that it will remain in placed position in a water filled aquarium.

Another object of the invention is to provide a formed one-piece mirrored ornament which is open on the bottom, together with sealing means extending along the bottom edges of the mirrored sections for preventing water deterioration of the reflective coating of the ornament member.

A still further object of the invention is to provide the combination of a three dimensional decorative mirrored ornament with a fish aquarium for us with fish that attempt to establish an order of dominance in the colony in the aquarium.

Other objects and advantages of the invention will be apparent from the following description taken in conjunction with the accompanying drawings wherein:

BRIEF DESCRIPTION OF DRAWINGS

FIG. 1 is a top plan view of a mirrored ornament embodying the invention;

FIG. 2 is an elevational view of the ornament of FIG. 1;

FIG. 3 is an elevational view of the ornament of FIGS. 1 and 2 taken along the plane of line 3—3 of FIG. 1 looking in the direction of the arrows;

FIG. 4 is a bottom plan view of the ornament of FIGS. 1-3;

FIG. 5 is a sectional view taken generally along the plane of line 5—5 of FIG. 3, looking in the direction of the arrows; a plug sealing the opening in the bottom wall of the ornament is shown in phantom lines;

FIG. 6 is an elevational view of the ornament of the invention in combination with a fish aquarium;

FIG. 7 is a partially broken, reduced size side elevational view of a modification of the ornament of FIGS. 1-5;

FIG. 8 is a bottom plan view of the modified ornament of FIG. 7;

FIG. 9 is a partially broken side elevational view of a further modification of ornament, and one having an open bottom for receiving water from the aquarium interiorly of the ornament housing; and FIG. 10 is a bottom plan view of the FIG. 9 ornament.

DESCRIPTION OF PREFERRED EMBODIMENT AND ALTERNATE EMBODIMENTS

Referring now again to the drawings, there is illustrated a fish aquarium 10 having a bottom 12 and preferably having a layer of sand 14 on the bottom on which is disposed a decorative ornament 16 embodying the invention. Referring particularly to FIGS. 1-5 the ornament 16 comprises a three dimensional mirrored member including, in this embodiment, a plurality of separate side mirror segments 18, 18a, 18b and 18c. In the embodiment illustrated, the side mirror segments are of triangular configuration in elevation, comprising side edges 20 and a bottom edge 22 with the side edges of the adjacent mirror segments being disposed in generally abutting condition to define an ornament enclosure, and with there being provided water resistant sealing means 24, such as for instance an epoxy, or the like, extending along the adjacent side edges of the side mirror segments for sealing the interior of the ornament enclosure from ingress of water that is disposed in the aquarium 10.

A bottom wall 25 extends transversely between the side wall mirror segments 18 to 18c, and sealing means 24' such as for instance the aforementioned epoxy, seals the bottom wall to the side mirror segments, to likewise prevent the ingress of water into the interior of the ornament enclosure that is disposed above the bottom wall 25. In the embodiment illustrated the bottom wall 25 includes upwardly and inwardly turned flange portions 25a adapted for abutting relationship with the confronting interior surface of the respective side mirror segment, with the aforementioned sealing means 24' coacting between the flanges and the interior surfaces of the segments, to prevent the ingress of water into the interior of the ornament enclosure above the bottom wall. Bottom wall 25 in the embodiment illustrated in FIGS. 1 through 5, includes an opening 27 therethrough and a removable plug 28 is provided for sealing the opening and preventing the ingress of water into the ornament enclosure above the bottom wall 25 via opening 27.

In order to weight the ornament, sand or some other suitable material may be inserted through the opening 27 into the enclosure to fill the same and provide sufficient weight to firmly hold the decorative ornament on the bottom of the aquarium when the latter is filled with water.

In order to insure that the water will not damage the mirrored surfaces of the side wall segments or the usual back-up paint of the mirrored surfaces, the bottom edge 22 of each of the side wall segments is preferably coated with the aforementioned sealing means (e.g. epoxy) and as at 24" (FIG. 4) thus sealing the bottom edges of the mirror segments disposed below the bottom wall 25. This helps to insure that the reflective surfaces of the mirror segments will not be affected by the water in the aquarium.

When the decorative ornament is disposed in an aquarium 10 there are preferably included in the aquarium certain varieties of fish, such as for instance the Betta type fish (Siamese fighting fish) which attempts to establish an order of dominance in the aquarium colony with respect to like species. This type of fish, when it sees its reflection in a confronting side mirror segment will cause it to swim laterally to a side edge 20 of the segment where its image will disappear, but then reappear on the next adjacent mirror segment. This effect will cause the Betta fish to swim actively around the pyramid ornament as it chases its reflection in the mirrored surfaces of the ornament, which enhances the entertainment aspects of the fish aquarium.

Referring now to FIGS. 7 and 8 there is disclosed a modified form of pyramidal mirrored ornament 16' wherein the bottom wall 25' instead of being recessed interiorly of the ornament enclosure is disposed along the bottom edges of the juxtaposed side mirror segments, and the sealing means 24" along the edges of the bottom wall and the bottom edges of the side mirror segments seals the interior of the modified ornament 16' against the ingress of water from the aquarium. The interior of this modified embodiment can likewise be filled or partially filled with sand or the like, so as to weight the ornament down in a water filled aquarium. The bottom wall 25' may be non-apertured and thus eliminate the need for any plug. In other respects this modified form of decorative mirrored ornament may be generally similar to the first described ornament.

Referring now to FIGS. 9 and 10, there is illustrated another embodiment 16" of mirrored ornament. In this embodiment, the ornament is formed as a one-piece enclosure, instead of being fabricated of separate mirror segments, with the enclosure being open on the bottom thereof so that the reflective coating and back-up paint interiorly of the enclosure is exposed to the water in a water filled aquarium. The ornament enclosure may be, for instance cast, or molded as a one-piece unit. However, the bottom edges 22 of the mirrored side sections of the ornament are sealed with the aforementioned water resistant sealing means 24" so as to prevent water deterioration of the reflective coating and usual back-up paint of the mirrored sections.

Ornament 16" may be filled with water from the aquarium as it is inserted therein to eliminate all or most of the air from the interior of the ornament, and thus the weight of the ornament is sufficient to maintain it in placed position in the aquarium. Operation of this modified ornament in connection with the Betta fish species is the same as with that described in connection with the first described embodiments of ornaments.

From the foregoing description and accompanying drawings it will be seen that the invention provides a novel aquarium ornament adapted to be disposed interiorly of a fish aquarium with the ornament comprising a decorative three dimensional mirrored member including a plurality of side mirror sections or segments defining an enclosure, together with sealing means to prevent water deterioration of the reflective coating of the ornament.

In certain embodiments, there is provided a bottom wall extending transversely between the side mirror segments, together with means sealing the bottom wall to the side mirror segments for preventing the ingress of water into the ornament enclosure, together with means adapted for disposal interiorly of the ornament for weighting the same. In another embodiment, the bottom wall is eliminated, and the ornament is formed as a one-piece member.

The invention also provides a novel combination of a mirrored three dimensional ornament in conjunction with a fish aquarium wherein the aquarium may contain a variety of fish such as the Betta fish, which tends to establish an order of dominance in the colony in the aquarium so that the fish which sees itself as another fish of the same variety will be caused to swim to an edge of the confronting side face of the ornament device where the fish's image disappears but then reappears on an adjacent side face, thus causing the fish to swim actively around the ornament and creating an entertaining aspect for the fish aquarium.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In combination a fish aquarium and a three dimensional mirrored aquarium ornament disposed in said aquarium, said ornament comprising plural mirror segments each including a base edge and side edges with said segments being disposed in generally abutting edge-to-edge relation to define an enclosure, means in said enclosure for weighting said ornament, and means oriented along abuttting edges of said segments to prevent the ingress of water into said enclosure and to prevent deterioration of the reflective coating of the mirror segments, and wherein said plural mirror segments include four side mirror segments defining a regular pyramidal shape and wherein said ornament includes a bottom wall, said bottom wall having an opening therethrough, and a plug for said opening to prevent the ingress of water into the interior of said ornament enclosure above said bottom wall.

2. The combination in accordance with claim 1 wherein said means weighting said ornament comprises sand disposed in said enclosure.

3. The combination in accordance with claim 1 wherein said bottom wall comprises a web extending between all side mirror segments of said ornament and including upwardly and inwardly turned flanges on said bottom wall for aiding in securing said bottom wall to the interior sides of said side segments of said ornament.

4. An aquarium ornament adapted to be disposed interiorly of a fish aquarium, said ornament comprising a decorative three dimensional mirrored member including a plurality of side mirror segments, each of which comprises a base edge and side edges, said side edges of adjacent mirror segments being disposed in generally abutting condition to define an enclosure, and sealing means extending along said side edges for sealing the interior of said ornament from the ingress of water, and a bottom wall extending transversely between said side mirror segments, means sealing said bottom wall to said side mirror segments, and means adapted for disposal interiorly of said ornament for weighting the same.

5. An aquarium ornament in accordance with claim 4 wherein each of said side mirror segments is of triangular configuration in elevation, with said enclosure being of pyramidal shape.

6. An aquarium ornament in accordance with claim 4 wherein said bottom wall includes an opening therethrough and a plug disposed in said opening, said plug providing sealing relationship with the periphery of said opening to prevent the ingress of water into the interior of said ornament enclosure above said bottom wall.

7. An aquarium ornament in accordance with claim 6 wherein said bottom wall comprises a web extending generally horizontally between said side mirror segments and including upwardly and inwardly turned flange portions adapted for abutting relationship with the confronting interior surface of the respective side mirror segment, and sealing means for said bottom wall coacting between said flanges and said interior surfaces to prevent the ingress of water into the interior of said ornament above said bottom wall.

8. An aquarium ornament in accordance with claim 5 wherein said ornament includes four equal size side mirror segments.

9. An aquarium ornament in accordance with claim 4 wherein said sealing means comprises an epoxy or the like.

10. An aquarium ornament in accordance with claim 5 wherein each of said mirror segments is of generally equal size, said sealing means comprising an epoxy or the like and wherein said ornament is adapted for use with a predetermined type of fish whereby the fish are caused to swin actively around the ornament due to the image of the fish appearing on said side mirror segments as the fish approach said ornament and move laterally to a side edge thereof.

11. In combination a fish aquarium and a three dimensional mirrored aquarium ornament disposed in said aquarium, said ornament being of pyramidal shape, said ornament comprising plural mirrored side seqments forming the exterior sides of said ornament, each said segment including a base edge and side edges with said side edges of said segments disposed in generally abutting edge-to-edge relation to define an enclosure, said ornament including a bottom wall extending transversely between said mirrored side segments with means attaching said bottom wall to said mirrored segments.

12. An aquarium ornament adapted to be disposed interiorly of a fish aquarium, said ornament comprising a decorative three dimensional mirrored surface member defining a pyramidal shaped container, said ornament including a plurality of exterior side mirror segments of generally equal size each of which comprises a base edge and side edges, said side edges of adjacent mirror segments being disposed in generally abutting condition to define an enclosure, and a bottom wall extending transversely between said side mirror segment with means attaching said bottom wall to said side mirror segments.

* * * * *